United States Patent
Guthke

[11] Patent Number: 6,049,949
[45] Date of Patent: Apr. 18, 2000

[54] CABLE BINDER FOR BUNDLING OR SECURING CABLES AND THE LIKE

[75] Inventor: Hans-Peter Guthke, Steinkirchen, Germany

[73] Assignee: DaimlerChrysler Aerospace Airbus GmbH, Hamburg, Germany

[21] Appl. No.: 09/250,831

[22] Filed: Feb. 17, 1999

[30] Foreign Application Priority Data

Feb. 18, 1998 [DE] Germany ............... 198 06 628

[51] Int. Cl.$^7$ ............... B65D 63/00; H02G 3/00
[52] U.S. Cl. ............. 24/16 PB; 24/17 AP; 24/30.5 P
[58] Field of Search ............ 24/16 PB, 17 AP, 24/30.5 P; 248/74.3, 60

[56] References Cited

U.S. PATENT DOCUMENTS

| | | | |
|---|---|---|---|
| 3,011,745 | 12/1961 | Reid .................... | 248/74.3 |
| 3,054,585 | 9/1962 | Roberts et al. ........ | 24/16 PB |
| 3,102,311 | 9/1963 | Martin et al. ......... | 24/16 PB |
| 3,486,200 | 12/1969 | Orenick ................ | 24/16 PB |
| 4,462,141 | 7/1984 | Bogese ................. | 24/16 PB |
| 5,042,114 | 8/1991 | Parrish ................ | 24/16 PB |

FOREIGN PATENT DOCUMENTS

| | | | |
|---|---|---|---|
| 1573303 | 7/1969 | France ............. | 24/16 PB |
| 2732312 | 2/1979 | Germany . | |
| 8712155 | 12/1987 | Germany . | |

*Primary Examiner*—Victor N. Sakran
*Attorney, Agent, or Firm*—W. F. Fasse; W. G. Fasse

[57] ABSTRACT

A cable binder includes a cable binder head (1) and a cable binder band (3) extending therefrom. The cable binder head includes first and second planar contact surfaces (11, 18) that intersect each other at a contact angle ($\alpha$) in the range from 145° to 160°, and are adapted to establish a substantially uniform and continuous contact of the cable binder head (1) with the substantially circular outer contour of a cable or other elongate component (6) that is to be secured. The cable binder head has an opening (2) extending at an incline therethrough and adjoining an edge of the contact surface (11). This arrangement ensures the maximum contact of the binder band (3) and contact surfaces (11, 18) of the head (1) with the outer contour of the component (6) being secured, and minimizes or eliminates the formation of a triangular open gap (4) between the binder head and the component (6). The binder is preferably made of a polyetheretherketone (PEEK) for high temperature resistance, so that it can be used in applications at temperatures up to 260° C.

23 Claims, 2 Drawing Sheets

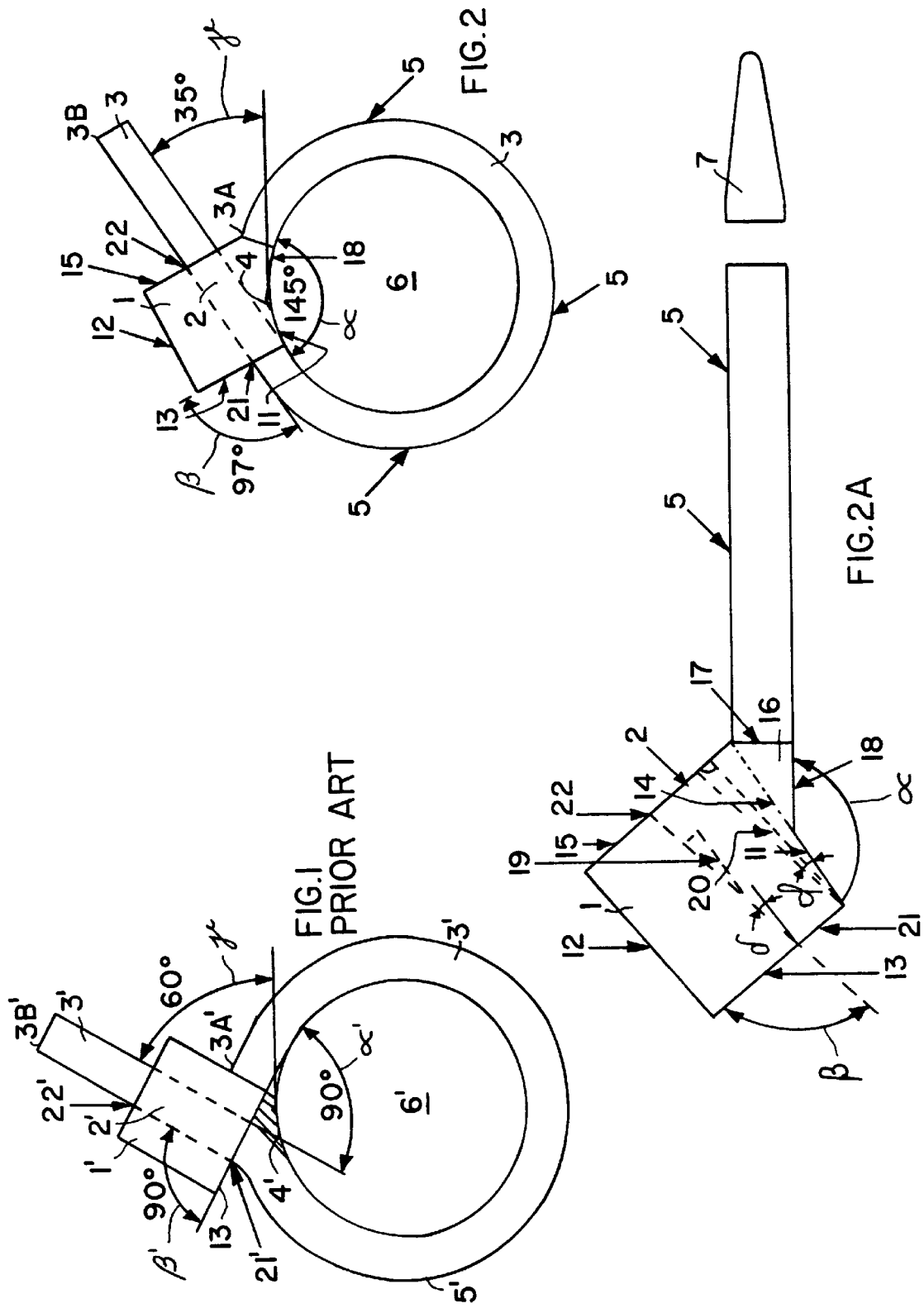

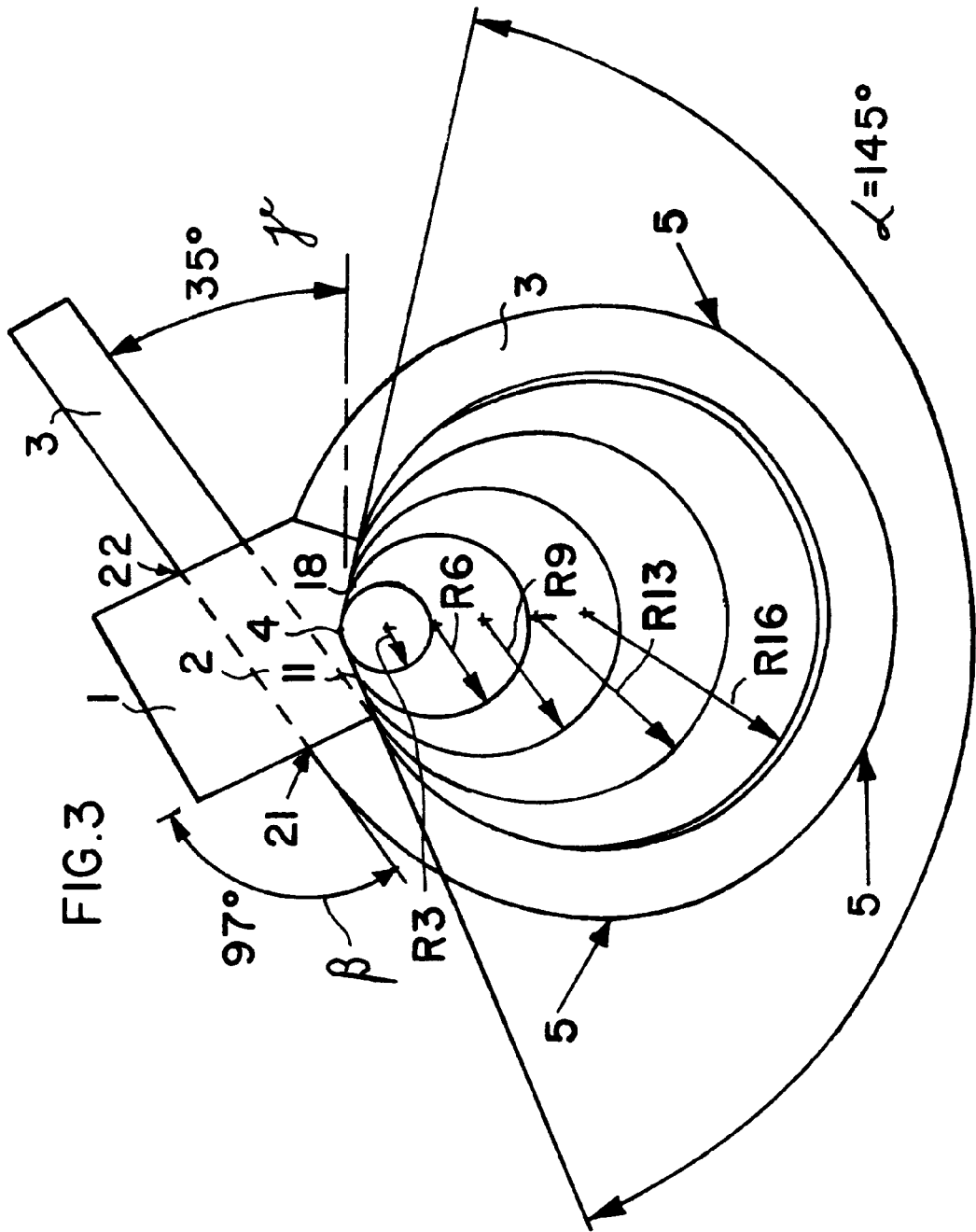

CABLE BINDER FOR BUNDLING OR SECURING CABLES AND THE LIKE

PRIORITY CLAIM

This application is based on and claims the priority under 35 U.S.C. §119 of German Patent Application 198 06 628.7, filed on Feb. 18, 1998, the entire disclosure of which is incorporated herein by reference.

FIELD OF THE INVENTION

The invention relates to a cable binder or cable tie for bundling or securing various elongated components, such as electrical cables, individual electrical conductors, cable bundles, hydraulic hoses, pneumatic hoses, pipes, conduits, ducts, and the like in the fields of machine construction, power plant construction, ship construction, vehicle construction, and the like, and particularly a high temperature resistant cable binder suitable for use in the areas of power generation and distribution.

BACKGROUND INFORMATION

It is conventionally known to use cable binders or cable ties in the field of aircraft construction. However, the conventional cable binders, due to their construction and the properties of the materials from which they are made, are not suitable for all securing or bundling applications of all electrical lines in the power generation and distribution of the aircraft. Such conventional cable binders are made of a polyamide, which previously have only been suitable for use in a temperature range from −55° C. to +135° C. Since the conventional plastic cable binders are not suitable for use along all of the electrical conductor routes in the aircraft, certain electrical conductor paths or routes that are subjected to high temperatures above 135° C. have traditionally been secured by means of conventional clamps, such as wormscrew-type or spring-type metal band clamps, or have required specialized mounting brackets and the like. The various pipes, conduits and ducts of the air conditioning system of an aircraft have conventionally also been secured using such clamps or equivalent clamping devices for achieving a sufficiently secure connection.

The known plastic cable binders also suffer the disadvantage that the conventional configuration thereof necessarily leaves a hollow space or gap, having a substantially triangular cross-sectional shape, between the body of the cable binder and the outer surface of a round or oval component such as a conduit or an electrical conductor or cable. More specifically, the conventional cable binders include a cable binder head and a cable binder band extending from the head, whereby the band encircles the cable or other component to be secured and is then passed back through the head and engaged therein. The configuration of the conventional cable binder head is such that the above mentioned triangular space or gap remains between the cable head and the cable binder band on the one hand, and the outer surface of the component being secured on the other hand.

Thus, although the conventional cable binders are often used for securing circular cross-section components, the configuration of the cable binders has not been well suited for securing such a circular cross-sectional component in a uniform circumferentially tensioned manner. Namely, the remaining triangular open space can lead to a locally unsecure portion of the connection, which can allow the penetration of moisture, environmental contaminants or the like into a component at this location or allow the leakage of gasses or liquids out of a connection at this location. This triangular unsecured zone also allows for shifting and chafing of a bundle of electrical conductors or the like, which can lead to breaks in the insulation or other problems at this location.

SUMMARY OF THE INVENTION

In view of the above it is an object of the invention to provide a cable binder of the above mentioned general type that is improved over the prior art so that it minimizes or totally avoids the formation of a hollow space or gap between the component or components being secured and the undersurface of the cable binder. It is a further object of the invention to provide such a cable binder having a high operating lifetime, particularly at temperatures above 135° C. and up to 260° C. The invention also aims to provide such a cable binder that may simply and economically be used to replace previously existing cable binders, by means of a simple installation procedure. The invention further aims to avoid or overcome the disadvantages of the prior art, and to achieve additional advantages, as apparent from the present specification.

The above objects have been achieved in a cable binder for bundling or securing one or more elongate components such as electrical cables, conductors, conduits, pipes, hoses, ducts and the like, according to the invention, as follows. The present cable binder comprises a cable binder head and a cable binder band that is connected to and extends from the cable binder head. The cable binder head includes an opening through which the cable binder band may be inserted and secured after passing around the elongate component that is to be secured or bundled. The cable binder head has a configuration including first and second planar partial contact surfaces that adjacently adjoin one another and intersect one another along a line, while extending at a contact angle of less than 180° relative to each other. Thereby the two planar partial contact surfaces together form an overall contact surface that has a tapered V configuration and is adapted to contact an outer surface or perimeter of the elongate component, which especially has a circular or substantially circular outer contour. The particular contact angle between the two partial contact surfaces is selected depending on and adapted to the cross-sectional size of the component or components that are intended to be secured or bundled using the cable binder.

By providing such a configuration of the cable binder head, the cable binder reduces or eliminates the open triangular gap or space that is typically formed between a prior art cable binder and a circular cross-section component that is secured by such a cable binder. Moreover, the opening provided in the cable binder head extends at such an angle through the cable binder head, in relation to the angle of the partial contact surfaces, so that the opening extends substantially tangential to a circular outer contour of the component being secured. Thereby the cable binder band does not need to be bent or kinked through an angle when it transitions from the outer contour of the component to pass through the opening in the cable binder head.

BRIEF DESCRIPTION OF THE DRAWINGS

In order that the invention may be clearly understood it will now be described in connection with an example embodiment, with reference to the accompanying drawings, wherein:

FIG. 1 is a schematic side view of a conventional or prior art cable binder in an installed condition;

FIG. 2 is a schematic side view of the cable binder according to the invention in an installed condition;

FIG. 2A is a schematic side view of the cable binder according to the invention as shown in FIG. 2, but in an initial extended or un-installed condition; and FIG. 3 schematically represents the cable binder shown in FIG. 2 in connection with different circular components that are to be secured and that respectively have different component diameters or radii.

DETAILED DESCRIPTION OF PREFERRED EXAMPLE EMBODIMENTS AND OF THE BEST MODE OF THE INVENTION

FIG. 1 shows a conventional cable binder that is typically used for securing and bundling electrical lines or cable bundles in the field of aircraft construction, as has been generally described above. The conventional cable binder is made of a polyamide that is only suitable or allowed for use in a temperature range from −55° C. to +135° C. due to the material properties of the polyamide. Because the conventional cable binder is thus not temperature-resistant and not suitable for use in certain applications subjected to temperatures above 135° C., it is not used for securing conductors for example along the so-called P and G conductor routes that are exposed to a temperature range up to 260° C. in an aircraft.

Thus, the securing of conductors or other lines for such applications is more difficult to carry out, and is generally achieved by using screw-type or spring-type metal band clamps, or clamping collars, or the like. It should be noted that such conventional clamps also form a triangular open gap between the head of the clamp and the circular outer contour of the component being secured. Additionally, at least some of the securing or holding locations in the P and G routes in an aircraft are also secured with specialized mounting brackets and the like.

Moreover, conventional cable binders have not been suitable for securing air ducts and the like in the air conditioning system of an aircraft, due to the inadequate temperature resistance range and due to the inadequate securing achieved in the area of the triangular open space or gap.

The typical conventional cable binder shown in FIG. 1 comprises a cable binder head 1' and a cable binder band 3' that is secured to and extends from the cable binder head 1'. The cable binder head 1' also serves to receive and secure the free end of the cable binder band 3' that has been looped or passed around the component 6' to be secured and then inserted through an opening 2' of the cable binder head 1'. From the side view of FIG. 1, it can be seen that the cable binder head 1' has a substantially quadrilateral block or cube shape, whereby the band-receiving opening 2' extends substantially through the center of this cube shape perpendicularly to a base surface or end surface 13' of the head 1'. Ignoring the catch tooth or catch teeth provided in the cable binder head 1', the cross-sectional configuration of the opening 2' is substantially matched to that of the cable binder band 3'.

The cable binder band 3' is secured to and extends from the lower portion of the right side surface of the cable binder head 1' at a right angle relative to the axis of the opening 2'. Thus, there is a 90° angle between the opening 2' and the axis of the fixed base end 3A' of the cable binder band 3' that is connected to and extends from the cable binder head 1'. As a result, a 60° angle is formed between the axis of the free end 3B' of the cable binder band 3' protruding out of the exit 22' of the opening 2' in the cable binder head 1' on the one hand, and a tangent to the outer circular contour of the component 6' in the area of the open triangular gap or space 4', as shown in FIG. 1.

Due to the above described configuration of the conventional cable binder head 1' and the band-receiving opening 2' therein, the substantially triangular cross-sectional hollow space or gap 4' is formed between the cable binder head 1' and the circular outer contour of the circular cross-sectional component 6' that is to be secured, when the cable binder band 3' is wrapped around the component 6' and then inserted into the entrance hole 21' of the opening 2', in which the free end 3B' of the cable binder band 3' is then secured by some means of catch tooth or other engagement.

As a result of the arrangement in which the axis of the opening 2' extends at 90° relative to the fixed base end 3A' of the cable binder band 3' that is secured to the cable binder head 1', the substantially triangular open space or gap 4' spans a contact angle α' of about 90° (or somewhat greater than 90° if the actual angular span of contact between the band 3' and the outer perimeter of the elongate component 6' is considered) as shown in FIG. 1. Due to this contact angle 4' of about 90°, there are limitations on the cross-sectional size and shape of the component that can be secured using such a cable binder. Moreover, since no securing force is applied by the cable binder to the component 6' in the area of the triangular space or gap 4', this results in a weak spot at this location, which can lead to various problems as discussed above.

In order to reduce or eliminate the above described triangular hollow space or gap 4' when securing elongate components such as conductors, cables, conduits, pipes and the like, or even bundles of such components, the cable binder according to the invention has an altered configuration as shown in FIGS. 2 to 4. Generally, the inventive cable binder still comprises a cable binder head 1 and a cable binder band 3 that is connected to and extends from the cable binder head 1 at a fixed base end 3A of the band 3. Preferably, the cable binder head 1 and the band 3 form one integral part. The cable binder head 1 has a band-receiving opening 2 extending therethrough. While these general features of the configuration are common to the above discussed prior art, the details of the configurations are substantially different from one another.

Referring to FIG. 2, it is apparent that the inventive cable binder has a binder head 1 that is not a simple cube as in the prior art, but rather has at least five surfaces in the side view of FIG. 2, or even six surfaces if the junction between the binder head 1 and fixed base end 3A of the binder band 3 is counted as a surface. The junction or union between the binder band 3 and the binder head 1 is not carried out perpendicular to a side surface of the binder head as in the prior art, but rather the binder band 3 generally extends from a corner or edge of the binder head 1. Moreover, the opening 2 for receiving the free end 3B of the binder band 3 in the binder head 1 does not extend centrally through the binder head 1 at 90° relative to the fixed end 3A of the binder band 3 that is integrally connected to the binder head 1. Instead, the entrance hole 21 to the opening 2 adjoins a contact surface 11 of the binder head 1 along an edge of the binder head 1, and extends at a sloping angle through the binder head 1, as will be discussed below.

The side of the cable binder head 1 that will face and contact the circular outer contour of the component 6 that is to be secured, comprises a V-shaped divided contact surface including a first planar partial contact surface 11 and a second planar partial contact surface 18 that adjoin one another at an intersection line and extend at a V-shaped angle relative to each other. The plan shape of each of the partial contact surfaces 11 and 18 is, for example, square in the present example embodiment, but can have any quadrilateral or rectangular shape depending on the specific dimensions and overall configuration of the cable binder head 1. The V-shaped angle between the two partial contact surfaces 11 and 18 defines the prescribed contact angle α, which is approximately 145° in the present embodiment.

This contact angle a of approximately 145° is particularly suited for securing an individual component or bundle of components having a diameter in the range from 1 mm to 40 mm, as can be understood generally in connection with FIG. 3. For components or component bundles having a diameter greater than 40 mm, the cable binder head 1 should be configured with a contact angle α of up to 160° between the two planar partial contact surfaces 11 and 18.

FIG. 2 shows the present cable binder in an installed condition, while FIG. 2A shows the cable binder in its initial or un-installed condition. Namely, as shown in FIG. 2, the cable binder band 3 extending from the cable binder head 1 has been wrapped around the circumference of the substantially circular cross-section of an electrical cable or bundle of cables or the like forming the component 6, and has then been inserted into the entrance hole 21 of the opening 2 in the cable binder head 1 until the free end 3B of the cable binder band 3 protrudes out from the exit hole 22 of the opening 2. The "substantially circular" cross-section refers to the non-uniform but generally circular, and somewhat elastically depressible or yieldable outer perimeter that is typical for a bundle of several conductors or cables or the like.

A catch tooth or teeth 19 protruding into the open passage of the opening 2 from the cable binder head 1 engages ribbing or engagement teeth 5 provided on the cable binder band 3 so as to securely hold the free end 3B of the cable binder band 3 in the cable binder head 1 and prevent the free end 3B of the cable binder band 3 from pulling back out of the opening 2. Thus, the cable binder band 3 can be pulled snug so as to apply a circumferential tension around the circular cross-section of the component 6 that is to be bound or secured. The engagement of the tooth or teeth 19 with the band 3 can be an automatic one-direction ratcheting engagement, or a manual tool-actuated engagement.

As described in greater detail below in connection with FIG. 2A, the opening 2 is arranged in the cable binder head 1 so that the axis of the opening 2 extends at a slope angle through the head 1, whereby particularly and entrance angle β of 97° is formed between the axis of the opening 2 and a tangent line extending along the frontal surface 13 of the cable binder head 1. With this arrangement, the entrance hole 21 leading into the opening 2 is located at an edge of the frontal surface 13 adjoining the first partial contact surface 11, while the exit hole 22 of the opening 2 is positioned generally at or near the center of the rear surface 15 of the cable binder head 1 opposite the frontal surface 13. Thus, the slope angle or incline angle δ of the opening 2 sloping at an incline through the cable binder head 1 is approximately 7° in the illustrated embodiment, as defined by the angle between the axis or side wall of the opening 2 and a fictitious base plane 20 extending perpendicularly relative to the rear surface 15 or parallel to a top surface 12 of the head 1. More generally, this incline angle δ may be in the range from 1° to 10° for example. Moreover, an exit angle γ of 35° is formed between the free end 3B of the cable binder band 3 protruding out of the exit hole 22 of the opening 2 and a tangent to the circumferential surface of the component 6 adjacent the location of the intersection of the first and second partial contact surfaces 11 and 18. Also, the axis of the opening 22 extends at an angle of preferably no more than 30°, more preferably no more than 15°, and even more preferably no more than 10°, relative to the plane of the first contact surface 11. The angle at which the binder band 3 extends at its fixed end 3A from the head 1 is similarly preferably no more than 30°, 15° or especially 10° relative to the plane of the second contact surface 18. These angular limitations ensure that there is a uniform, tight gap-free contact between the cable binder and the elongate component 6.

Namely, due to the above described arrangement of the present cable binder, including two partial contact surfaces 11 and 18 extending at a contact angle relative to each other, and including a special configuration of the binder head 1 with the opening 2 extending at a slope or incline therethrough, the inventive arrangement substantially reduces or completely eliminates the triangular open space or gap 4' that existed in the prior art configuration of FIG. 1. Instead, a very small triangular gap 4, or no gap at all, remains between the intersection line of the two partial contact surfaces 11 and 18 and the circumferential surface of the component 6 that is being secured, as shown in FIG. 2.

Now with further reference to FIG. 2A, it can be seen that the first partial contact surface 11 does not extend parallel to the top surface 12 of the quadrilateral block-shaped main body portion of the cable binder head 1. Instead, the partial contact surface 11 extends at a surface tilt angle φ relative to the fictitious base plane 20 mentioned above, which extends parallel to the top surface 12. This angle p may be in the range from 1° to 10°, for example, to achieve the intended objects. The outer or free edge of the first partial contact surface 11 adjoins the bottom edge of the frontal surface 13 directly adjacent the entrance hole 21 of the opening 2, and from there the first partial contact surface 11 extends as a flat plane to the above mentioned line of intersection with the second partial contact surface 18, whereby a contact angle α of 145° is formed between the two partial contact surfaces 11 and 18. In turn, the second partial contact surface 18 extends as a flat plane to its outer edge where it adjoins or extends flush with the bottom edge or surface of the cable binder band 3. The band 3 joins the side surface or union surface 17 of the binder head 1, which extends substantially perpendicular to the second partial contact surface 18.

With the above arrangement, a triangular or three-sided prism body 16 forming an integral part of the binder head 1 protrudes outwardly beyond a fictitious extension plane 14 extending along the plane of the first partial contact surface 11. One side of this three-sided prism body 16 is formed by the second partial contact surface 18, and another side is formed by the side surface or union surface 17, while the third side integrally joins the rest of the body of the binder head 1 along the fictitious extension plane 14.

FIG. 2A further shows the provision of ribbing or engagement teeth 5 extending along at least a partial range of the upper or outer surface of the cable binder band 3. It is not necessary that the range of engagement teeth 5 extends all the way to the tip portion or tongue 7 at the free end 3B of the band 3, nor all the way to the fixed end 3A at which the band 3 is joined to the binder head 1. When the cable binder is in an installed condition, with the tongue or tip portion 7 of the band 3 inserted through the opening 2, the catch tooth or teeth 19 provided in the opening 2 engages the ribbing or engagement teeth 5 to hold the cable binder in the secured condition as described above. The cross-sectional size and shape of the band 3 substantially corresponds to the cross-sectional size and shape of the opening 2. Moreover, the surface dimension or width of the band 3 can also correspond to the surface dimension or width of the side surface or union surface 17 of the cable binder head 1 to which the band 3 is joined.

FIG. 3 schematically illustrates the present cable binder in an installed condition around a component 6 having a relatively large diameter, and further schematically illustrates how such components 6 having different diameters, or different radii R3, R6, R9, R13, or R16, would be pressed securely against and into contact with the partial contact surfaces 11 and 18. In this example, the two partial contact surfaces 11 and 18 form a contact angle $\alpha=145°$ therebetween, for which the cable binder is especially suitable for securing components 6 having a diameter in the range from 1 mm to 40 mm as generally indicated by the several radii R3, R6, R9, R13, and R16. For securing components 6 having a larger diameter than 40 mm, a different configuration having a contact angle $\alpha$ in the range from 145° to 160° is preferably used. By properly adapting the contact angle $\alpha$ to the range of sizes of components to be secured with the cable binder, it is possible to reduce or eliminate the triangular free space or gap 4 formed between the vertex of the partial contact surfaces and the circular outer contour of the component 6. In this manner, the security and reliability of the connection is improved, and the seal-tightness of the connection in the case of the component 6 being a pipe or conduit or the like is also improved.

In order that the present cable binder can also be used in high temperature conditions, especially in the temperature range form 135° C. to 260° C., it is preferably made of a suitable high temperature resistant thermoplastic material, and most preferably a polyetheretherketone such as commercially available "VITREX" PEEK in an unreinforced condition. The present cable binder made of such a PEEK material is temperature resistant and form-stable, so that it can maintain its tension-holding and secure clamping ability in applications at temperatures up to 260° C. Therefore, it is possible to use the present cable binder in situations that previously required metal band clamps or the like for securing conductors, conduits, pipes and other lines.

Conventional techniques and tools, for example cable binder pliers, can be used to install the present improved cable binders as a replacement for the prior art cable binders, so there is no need of specialized tools or techniques. Due to its extended range of temperature resistance, the present cable binder made of PEEK material is especially suitable for securing and bundling together conductors, pipes, conduits, hoses, and other lines in the field of aircraft construction, especially in the above mentioned P and G routes, in VUs/VEs, in special engine areas such as the APU housing or in the area of pylons, as well as on engines themselves. The present improved cable binders will also find application in machine and power plant construction as components of the power generation system.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A cable binder adapted to secure at least one elongate component having an outer perimeter that is at least substantially circular, said cable binder comprising a cable binder head and a cable binder band, wherein:

said cable binder band comprises a flexible band having a fixed end joined to said cable binder head and a free end extending opposite said fixed end, and said flexible band is adapted to extend around an outer perimeter of the at least one elongate component;

said cable binder head has an opening therein adapted to receive said free end of said band inserted therein when said band extends around the outer perimeter of the at least one elongate component; and said cable binder head comprises first and second planar contact surfaces, wherein said contact surfaces are arranged adjacent one another so as to form a contact angle ($\alpha$) less than 180° therebetween, said contact surfaces intersect each other at an intersection line located at a vertex of said contact angle, and said contact surfaces are adapted to contact the outer perimeter of the at least one elongate component when said band extends around the outer perimeter of the at least one elongate component and said free end is received in said opening of said cable binder head.

2. The cable binder according to claim 1, wherein said contact angle is such that a contact between said first and second planar contact surfaces and the outer perimeter of the at least one elongate component is maximized.

3. The cable binder according to claim 2, arranged and adapted so as to form an open gap between the outer perimeter of the at least one elongate component and said first and second planar contact surfaces at said intersection, and wherein said contact angle is set to a particular angle in said range so as to minimize a size of said open gap.

4. The cable binder according to claim 1, wherein said contact angle is in a range from 145° and to 160°.

5. The cable binder according to claim 4, wherein said contact angle is 145°, and said cable binder band has a length adapted to extend around the outer perimeter of the at least one component having a diameter in a range from 1 mm to 40 mm.

6. The cable binder according to claim 4, wherein said contact angle is 160°, and said cable binder band has a length adapted to extend around the outer perimeter of the at least one component having a diameter greater than 40 mm.

7. The cable binder according to claim 1, wherein said cable binder head further comprises a frontal surface having an edge adjoining said first contact surface and a rear surface opposite said frontal surface, and wherein said opening comprises an open passage extending entirely through said cable binder head from an entrance hole adjoining said edge in said frontal surface to an exit hole in said rear surface along an axis of said open passage that is substantially parallel to said first contact surface.

8. The cable binder according to claim 1, wherein said first contact surface is a first right-angled parallelogram surface, and said second contact surface is a second right-angled parallelogram surface having the same dimensions as said first right-angled parallelogram surface.

9. The cable binder according to claim 8, wherein said cable binder head further comprises a frontal surface that adjoins said first right-angled parallelogram surface along a first edge, and said first right-angled parallelogram surface adjoins said second right-angled parallelogram surface along an intersection line parallel to and opposite said first edge.

10. The cable binder according to claim 1, wherein said cable binder head comprises a main body portion and a triangular prism body portion adjoining and protruding from said main body portion along a plane extending coplanarly from said first contact surface, and said triangular prism body portion is externally bounder by said second contact surface and by a prism side surface.

11. The cable binder according to claim 10, wherein said fixed end of said cable binder band is joined to said cable binder head at said prism side surface, and a cross-sectional area of said fixed end joined onto said prism side surface matches a shape of said prism side surface.

12. The cable binder according to claim 11, wherein said cable binder head further comprises a planar top surface generally opposite said first and second contact surfaces, a planar frontal surface extending between a first edge of said top surface and an edge of said first contact surface, and a planar rear surface extending between a second edge of said top surface and an edge of said prism side surface.

13. The cable binder according to claim 1, consisting of an unreinforced thermoplastic material that is temperature resistant to a temperature greater than 135° C. and up to 260° C.

14. The cable binder according to claim 13, wherein said thermoplastic material is a polyetheretherketone.

15. A cable binder adapted to secure at least one elongate component, said cable binder comprising a cable binder head and a cable binder band, wherein:

said cable binder band comprises a flexible band having a fixed end joined to said cable binder head and a free end extending opposite said fixed end, and said flexible band is adapted to extend around an outer perimeter of the at least one elongate component;

said cable binder head has an opening therein adapted to receive said free end of said band inserted therein when said band extends around the outer perimeter of the at least one elongate component;

said cable binder head comprises first and second planar contact surfaces that are arranged adjacent one another so as to form a contact angle ($\alpha$) less than 180° therebetween, and that are adapted to contact the outer perimeter of the at least one elongate component when said band extends around the outer perimeter of the at least one elongate component and said free end is received in said opening of said cable binder head;

said opening extends through said cable binder head along an opening axis with a first slope angle of no more than 30° relative to said first contact surface;

said cable binder band extends from said cable binder head at said fixed end along a band axis with a second slope angle of no more than 30° relative to said second contact surface; and said contact angle is in a range from 145° to 160°.

16. The cable binder according to claim 15, wherein said first slope angle is no more than 15°, and said second slope angle is no more than 5°.

17. The cable binder according to claim 16, wherein said cable binder band is joined to said cable binder head such that a surface of said cable binder band adapted to contact the outer perimeter of the at least one elongate component adjoins flushly with said second contact surface, said opening passes through said cable binder head from an entrance hole to an exit hole, and said entrance hole borders on an edge of said first contact surface.

18. The cable binder according to claim 17, wherein said cable binder head further comprises a frontal surface that adjoins said first contact surface along said edge of said first contact surface, and said entrance hole is located in said frontal surface bordering on said edge.

19. A cable binder adapted to secure at least one elongate component, said cable binder comprising a cable binder head and a cable binder band, wherein:

said cable binder band comprises a flexible band having a fixed end joined to said cable binder head and a free end extending opposite said fixed end, and said flexible band is adapted to extend around an outer perimeter of the at least one elongate component;

said cable binder head has an opening therein adapted to receive said free end of said band inserted therein when said band extends around the outer perimeter of the at least one elongate component;

said cable binder head comprises first and second planar contact surfaces that are arranged adjacent one another so as to form a contact angle ($\alpha$) less than 180° therebetween, and that are adapted to contact the outer perimeter of the at least one elongate component when said band extends around the outer perimeter of the at least one elongate component and said free end is received in said opening of said cable binder head;

said cable binder head has a block shape externally bounded by surfaces including at least said first and second contact surfaces, a top surface generally opposite said first and second contact surfaces, a frontal surface adjoining and extending from said top surface toward said first contact surface, and a rear surface that is generally opposite said frontal surface and that is adjoining and extending from said top surface toward said second contact surface; and said cable binder further comprises at least one additional feature selected from the group consisting of a first feature wherein said first contact surface adjoins an edge of said frontal surface opposite said top surface and extends at an acute surface tilt angle relative to said top surface, and a second feature wherein said opening comprises an open passage extending entirely through said cable binder head from said frontal surface to said rear surface at an acute incline angle relative to said top surface and at a non-perpendicular entrance angle relative to said frontal surface.

20. The cable binder according to claim 19, having said first feature.

21. The cable binder according to claim 20, wherein said acute surface tilt angle is in a range from 1° to 10°.

22. The cable binder according to claim 19, having said second feature.

23. The cable binder according to claim 22, wherein said incline angle is 7° and said entrance angle is 97°.

* * * * *

UNITED STATES PATENT AND TRADEMARK OFFICE
CERTIFICATE OF CORRECTION

PATENT NO. : 6,049,949
DATED : April 18, 2000
INVENTOR(S) : Guthke

It is certified that error appears in the above-identified patent and that said Letters Patent is hereby corrected as shown below:

<u>Column 6</u>:
Line 30, replace "Φ" by --φ--;

Line 32, replace "p" by --φ--.

Signed and Sealed this

Twelfth Day of June, 2001

*Attest:*

*Attesting Officer*

NICHOLAS P. GODICI
*Acting Director of the United States Patent and Trademark Office*